United States Patent [19]

Sellstrom

[11] Patent Number: 4,487,805
[45] Date of Patent: Dec. 11, 1984

[54] DECORATIVE EPOXY RESIN AGGREGATE BINDER FORMULATION

[75] Inventor: Kathy B. Sellstrom, Austin, Tex.

[73] Assignee: Texaco Inc., White Plains, N.Y.

[21] Appl. No.: 589,813

[22] Filed: Mar. 15, 1984

[51] Int. Cl.³ .............................................. C08K 5/34
[52] U.S. Cl. .................................. 428/413; 523/456; 523/461; 525/523; 528/104; 528/111
[58] Field of Search ............... 523/456, 461; 528/104, 528/111; 525/523; 428/413

[56] References Cited

U.S. PATENT DOCUMENTS

| | | | |
|---|---|---|---|
| 3,428,601 | 2/1969 | Dijkstra et al. | 528/104 |
| 3,496,138 | 2/1970 | Sellers et al. | 528/111 |
| 3,639,928 | 2/1972 | Bentley et al. | 525/523 |
| 3,950,451 | 4/1976 | Suzuki et al. | 528/107 |
| 4,076,764 | 2/1978 | Bauer | 523/456 |

OTHER PUBLICATIONS

Decorative Aggregate Studies.

*Primary Examiner*—Lewis T. Jacobs
*Attorney, Agent, or Firm*—Jack H. Park; Kenneth R. Priem; Richard A. Morgan

[57] ABSTRACT

A non-yellowing decorative epoxy resin aggregate binder formulation is disclosed. The formulation comprises 100 parts by weight polyepoxide, 25 parts by weight of a specified polyoxypropylene diamine, 26 parts by weight nonylphenol and 4 parts by weight N-aminoethylpiperazine and 1 to 3 parts by weight of a specified substituted benzotriazole UV absorber dissolved in xylene.

Nonylphenol gives the formulation strength with flexibility and resistance to weathering with a high gloss appearance. The substituted benzotriazole UV absorber prevents yellowing of the clear coating.

The formulation is useful as a clear coating to bind aggregate (colored pebbles) to a cement surface to form a decorative coating. The formulation is distinguished by its clear, non-yellowing appearance.

11 Claims, No Drawings

DECORATIVE EPOXY RESIN AGGREGATE BINDER FORMULATION

BACKGROUND OF THE INVENTION

1. Field of the Invention

This invention relates to curable epoxy resin systems. More particularly it relates to clear, non-yellowing epoxy resin formulations which cure to bind aggregate such as decorative pebbles to a surface.

2. Prior Art

Epoxy resins constitute a broad class of polymeric materials having a wide range of physical characteristics. The resins are characterized by epoxide groups which are cured by reaction with certain catalysts or curing agents to provide cured epoxy resin compositions with certain desirable properties. One such class of curing agents is the anhydrides. Another is the amines. It is known however that anhydrides and amines form clear coatings which yellow and deteriorate with time in the presence of sunlight. The problem of yellowing has been compensated for by the inclusion of UV absorbers or light stabilizers into the epoxy resin formulation. These additive materials are expensive which has prevented their use in amounts to cover large surfaces such as patios and driveways of residential houses. The problem has also been compensated for by using epoxy binders only on dark colored materials where the effect of yellowing is less detrimental to the appearance of the surface.

There is a need in the art for an inexpensive clear epoxy resin formulation for binding colored aggregate, particularly light colored materials, used outdoors and on surfaces exposed to sunlight which will not significantly yellow with time.

SUMMARY OF THE INVENTION

The present invention is a decorative aggregate binder formulation comprising aggregate, a polyepoxide and a stoichiometric amount of a novel curative. The polyepoxide is a vicinal polyepoxide having an average of at least 1.8 reactive 1,2-epoxy groups per molecule. The curative comprises: (i) 20 to 30 parts by weight (pbw) of a first diamine of the general formula:

wherein x averages from 1 to 6; (ii) 20 to 30 pbw of nonylphenol; (iii) 1 to 8 pbw N-aminoethylpiperazine; and (iv) 0.8 to 5 pbw of a substituted benzotriazole UV absorber of the formula:

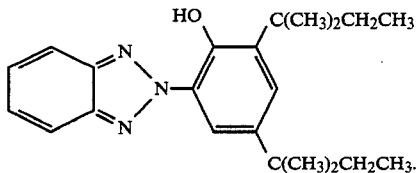

The invention is particularly useful for binding an aggregate such as colored pebbles to an outdoor patio, poolside deck or driveway in a decorative, non-yellowing coating.

DETAILED DESCRIPTION OF THE INVENTION

The present invention is an epoxy resin composition comprising:
(a) a vicinal polyepoxide having an average of at least 1.8 reactive 1,2-epoxy groups per molecule; and
(b) a stoichiometric amount of a curing agent comprising:
(i) 20 to 30 parts by weight (pbw) of a first diamine of the general formula:

wherein x averages from 1 to 6;
(ii) 20 to 30 pbw of nonylphenol; and
(iii) 1 to 8 pbw of N-aminoethylpiperazine; and
(iv) 0.8 to 5 pbw of substituted benzotriazole UV absorber of the formula:

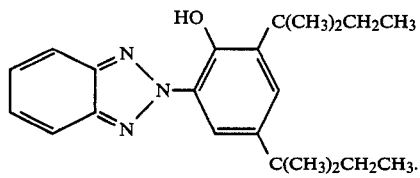

Generally the vicinal polyepoxide containing compositions which may be cured with the products of the invention are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolac, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin, and the like, with either a polyhydric phenol or a polyhydric alcohol. Typically the epoxy resins have an average of at least 1.8 reactive, 1,2- epoxy groups per molecule. An illustrative, but by no means exhaustive, listing of suitable dihydric phenols includes 4,4'-isopropylidene bisphenol, 2,4'-dihydroxydiphenylethyl methane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenyl- methane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis (4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as monothioglycerol, dithioglycerol and the like, polyhydric alcohol partial esters, such as monostearin, pentaerythritol monoacetate and the like, and halogenated polyhydric alcohols such as the monochlorohydrins of glycerol, sorbitol, pentaerythritol and the like.

Another class of polymeric polyepoxides which can be cured by the products of the invention in accordance with the present invention includes the epoxy novolac resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolac resins can be obtained in Lee, H. and Neville, K., *Handbook of Epoxy Resins*, McGraw Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole.

The novel curative of the present invention is reacted at ambient temperature and in a stoichiometric amount with the polyepoxide. The novel curative is:

(i) 20 to 30 parts by weight (pbw) of a first diamine of the general formula:

wherein x averages from 1 to 6;
(ii) 20 to 30 pbw of nonylphenol; and
(iii) 1 to 8 preferably 3 to 6 pbw of N-aminoethylpiperazine; and
(iv) 0.8 to 5 preferably 1 to 3 pbw of a substituted benzotriazole UV absorber of the formula:

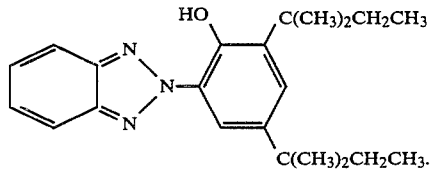

The first diamine of the present invention is a group of polyoxypropylene derived diamines wherein x averages from 1 to 6, preferably 2 to 3, most preferably 2.6. When x averages 2.6, the average molecular weight of the first diamine is 230. These first diamines are available commercially from Texaco Chemical Company under the tradename JEFFAMINE ® D-230.

The nonylphenol is added to the curative to improve strength and weathering properties. Up to certain levels, nonylphenol contributes benficial properties which contribute to a good bonded aggregate system. As the level of nonylphenol is increased the viscosity of the system increases. This causes a thicker coating to be deposited on the aggregate which improves weathering properties. Shorter gel times (pot life) are also the result of increasing nonylphenol levels. This shortened pot life means shorter drying or tack-free times. Although variations in nonylphenol level does not measurably affect final surface hardness, the most flexible systems are achieved with the most nonylphenol. Coating adhesion is not improved with varying the amount of nonylphenol. The addition of nonylphenol has been found to improve gloss.

Preferred nonylphenol concentration is found to lie in the 20 to 30 pbw range. It has been found that optimum properties are achieved when the amount of nonylphenol approximately equals the amount of first amine. Up to a certain nonylphenol level, strength properties are increased and modulus values are decreased, indicating stronger, more flexible systems. However, above that level, both strength and modulus values decrease sharply. Also, the heat deflection temperature decreases with very high nonylphenol levels. Impact and compression strength values are largely unchanged over a range of nonylphenol concentrations. With equal parts by weight of first amine and nonylphenol, the system is an excellent compromise between strength and weathering properties. The system cures in a reasonable length of time and still has enough working time for relatively simple installation of the aggregate/binder formulation. Too, the system is flexible enough to allow for expansion and contraction with temperature changes. Also, the system maintains a high gloss for a long period of time.

The active ingredient which prevents yellowing in the present invention is a specified substituted benzotriazole UV absorber. It has been found that this substituted benzotriazole UV absorber produces superior results in stabilizing optical yellowing whereas similar compounds displayed no ability to stabilize yellowing over a 14-day test in which white ceramic tiles were coated with formulations and then exposed to sunlight.

Most epoxy systems yellow badly upon exposure to sunlight. Addition of UV absorbers will not help in many cases because of reactions between tertiary amine catalysts and the UV absorbers, which causes a brilliant yellow discoloration. The additive in this formulation, a substituted benzotriazole UV absorber, was the only one of the many tested that not only did not cause the brilliant yellow discoloration, but also prevented most of the normal yellowing associated with epoxy systems.

When incorporated in an amount 0.8 to 5 preferably 1 to 3 parts by weight, formulations of the present invention display reduced yellowing on exposure to sunlight. The coatings were hard, flexible and retained a glossy appearance all of which properties make them good decorative coatings. These coatings may be used alone or they may be used to bind aggregate to surfaces, typically cleaned cement surfaces. Aggregate may be colored pebbles, stones or shell. Metallic flecs, colored plastic flecs, decorated (printed) paper, wood or wooden chips (chipboard) may be coated.

The substituted benzotriazole UV absorber is first dissolved in a solvent, most preferably xylene. The solvents n-butyl acetate, ethyl acetate, methyl ethyl ketone or mineral spirits may alternatively be used. In the alternative, the substituted benzotriazole UV absorber can be melted into the amine without use of solvent. The UV absorber is then combined with the other curing agents. The curing agents are then admixed with the polyepoxide composition in an amount according to the equivalent weight of the curing agents employed. Generally the number of equivalents of amine groups is equal to or slightly less than the number of epoxide equivalents present in the curable epoxy resin composition, with a stoichiometric amount being preferred.

The constituents forming the curable material are intimately mixed by standard methods. Finally, in curing the epoxy resin, the reactants are simply admixed in correct equivalent ratios and then combined with aggregate before being applied to the surface. Curing is effected at temperatures of 55° F. or greater in the atmosphere. Ambient temperatures of greater than 80° F. will cause a reduction in pot life (working time) for the epoxy-aggregate system.

The properties of the present invention are better shown by way of example.

EXAMPLE

| | 8B | 6A | 6C | 6E | 6G | 6I | 6M | 6O | 6Q | 6S | 6U |
|---|---|---|---|---|---|---|---|---|---|---|---|
| Formulation pbw | | | | | | | | | | | |
| Epoxy Resin (WPE 188) | 100 | 100 | 100 | 100 | 100 | 100 | 100 | 100 | 100 | 100 | 100 |
| JEFFAMINE ® D-230 | 25 | 25 | 25 | 25 | 25 | 25 | 25 | 25 | 25 | 25 | 25 |
| Nonylphenol | 26 | 26 | 26 | 26 | 26 | 26 | 26 | 26 | 26 | 26 | 26 |
| N—aminoethylpiperazine | 4 | 4 | 4 | 4 | 4 | 4 | 4 | 4 | 4 | 4 | 4 |
| Tinuvin 292 | — | 1.6 | — | — | — | — | — | — | — | — | — |
| Tinuvin 328 (in xylene) | — | — | 2.3 | — | — | — | — | — | — | — | — |
| Cyasorb UV5411 (in ethyl acetate) | — | — | — | 0.8 | — | — | — | — | — | — | — |
| Cyasorb UV9 (in xylene) | — | — | — | — | 0.8 | — | — | — | — | — | — |
| Cyasorb UV531 (in n-heptane) | — | — | — | — | — | 1.6 | — | — | — | — | — |
| Uvinul 400 (in methanol) | — | — | — | — | — | — | 2.3 | — | — | — | — |
| Uvinul N-539 | — | — | — | — | — | — | — | 2.3 | — | — | — |
| Uvinul 408 (in toluene) | — | — | — | — | — | — | — | — | 2.3 | — | — |
| Mark 1535 | — | — | — | — | — | — | — | — | — | 0.8 | — |
| Carstab 702 | — | — | — | — | — | — | — | — | — | — | 0.8 |
| Yellowing Index (ASTM D-1925) | | | | | | | | | | | |
| Initial | 13.59 | 10.89 | 9.14 | 16.13 | 30.75 | 28.04 | 26.00 | 27.41 | 36.96 | 34.92 | 36.68 |
| After 6 hours | 26.51 | 46.88 | 9.49 | 32.59 | — | — | — | 61.22 | — | — | — |
| After 24 hours | 50.22 | 57.29 | 9.93 | 38.49 | — | — | — | 69.90 | — | — | — |
| After 48 hours | 61.54 | 65.12 | 11.25 | 47.07 | — | — | — | 79.71 | — | — | — |
| After 7 days | 75.87 | 65.36 | 12.65 | 60.87 | — | — | — | 92.49 | — | — | — |
| After 14 days | 78.17 | — | 17.91 | — | — | — | — | — | — | — | — |

TABLE OF UV ABSORBERS

TINUVIN 328 (Ciba-Geigy)
Substituted benzotriazole UV absorber

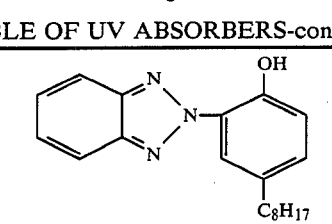

TINUVIN 292 (Ciba-Geigy)
Hindered tertiary amine light stabilizer

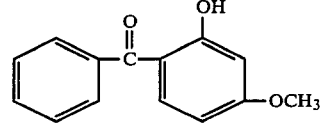

CYASORB UV 5411 (Cyanamid)
Substituted benzotriazole UV absorber

TABLE OF UV ABSORBERS-continued

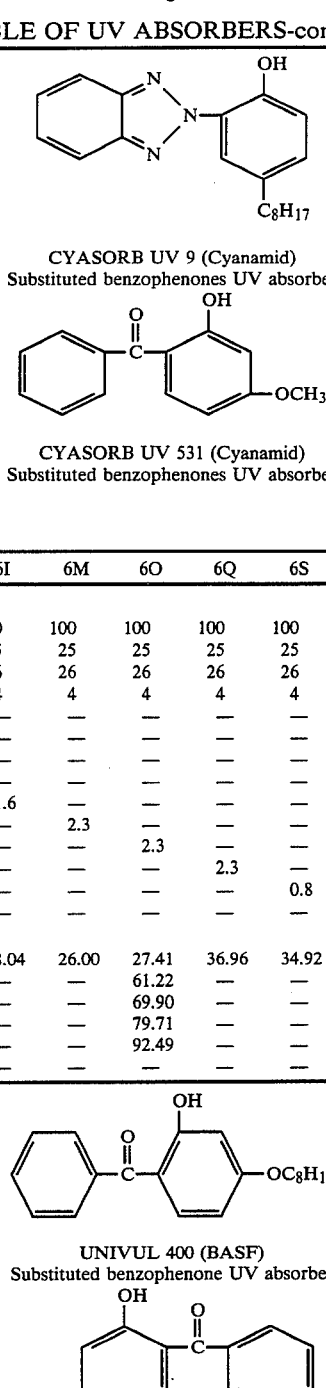

CYASORB UV 9 (Cyanamid)
Substituted benzophenones UV absorber

CYASORB UV 531 (Cyanamid)
Substituted benzophenones UV absorber

UNIVUL 400 (BASF)
Substituted benzophenone UV absorber

UNIVUL N-539 (BASF)
Cyano acrylate UV absorber

UNIVUL 408 (BASF)
Substituted benzophenone UV absorber

TABLE OF UV ABSORBERS-continued

MARK 1535 (Argus/Witco)
Substituted benzophenone UV absorber
CARBSTAB 702 (Thiokol/Carstab)
Substituted benzophenon UV absorber

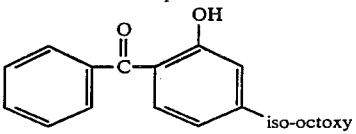

SUPPLEMENTARY DATA

The supplementary data shows the effect of nonylphenol in a decorative aggregate binder formulation.

Up to certain levels, nonylphenol contributes significantly and positively to many of the properties which characterize a good bonded aggregate system. Of the 20 formulations given in this supplementary data, Formulation D represents the best combination of all the properties considered.

TABLE 1

| FORMULATION, pbw | A | B | C | D | E |
|---|---|---|---|---|---|
| Liquid epoxy resin (EEW ~188) | 100 | 100 | 100 | 100 | 100 |
| JEFFAMINE ® D-230[1] | 25 | 25 | 25 | 25 | 25 |
| N—aminoethylpiperazine (AEP)[1] | 4 | 4 | 4 | 4 | 4 |
| Nonylphenol | — | 5[2] | 12 | 26 | 53 |
| Resin: curing blend volume ratio | 2.8:1 | 3:1 | 2:1 | 3:2 | 1:1 |

[1]Texaco Chemical Company
[2]Nonylphenol was added to the resin in this case; in Formulations C, D, and E, nonylphenol was mixed with AEP and JEFFAMINE ® D-230 to form the curing blends. After being mixed, the curing blends were allowed to cool to 25° C. before they were used to develop exotherm data.

TABLE 2

| EXOTHERM DATA AND COATING PROPERTIES | | | | | |
|---|---|---|---|---|---|
| FORMULATION | A | B | C | D | E |
| Exotherm data | | | | | |
| Brookfield viscosity, cps ~25° C. | 930 | 900 | 1,380 | 1,660 | 2,740 |
| Gel time, minutes (200 g mass) | ~168[1] | ~70 | 53.5 | 28.0 | 22.5 |
| Peak exothermic temperature, °C. | 144.2 | 169.6 | 187.3 | 186.5 | 159.5 |
| Time to peak temperature, minutes | ~209 | 90.5 | 65.6 | 36.0 | 31.8 |
| Coating Properties, 6 mil film | | | | | |
| Drying time, hr | | | | | |
| set-to-touch | 7.7 | 6.6 | 5.7 | 3.0 | 3.2 |
| surface dry | 11.7 | 10.0 | 7.9 | 7.4 | 5.9 |
| thru dry | 16.0 | 15.8 | 13.0 | 12.7 | 10.0 |
| Pencil hardness | | | | | |
| cure, 24 hr ~25° C. | F-H | F-H | F-H | F-H | HB-F |
| 7 days ~25° C. | H | H | H | H | H |
| Gardner impact, in-lb to fail (rev/dir) | | | | | |
| cure, 24 hr ~25° C. | <4/10 | <4/10 | <4/14 | 16/36 | 160/>160 |
| 7 days ~25° C. | <4/14 | <4/16 | <4/18 | 14/30 | 140/>160 |
| Gloss, 60° C., 7 days ~25° C. | 90 | 100 | 111 | 112 | 110 |
| Crosshatch adhesion, %, | | | | | |
| 7 days ~25° C. | 100 | 100 | 100 | 100 | 100 |

[1]Time Required to reach 10,000 cps. No definite gel time was noted.

Conclusions
1. As the level of nonylphenol was increased, the viscosity of the system increased. This will cause a thicker coating to be deposited on the aggregate which may improve weathering properties.
2. Shorter gel times were noted as nonylphenol levels increased. This shortened post life can be translated to mean shorter drying or "tack-free" times.
3. Although final surface hardness was the same for all systems, those systems containing the most nonylphenol were the most flexible. Gloss was improved with the addition of nonylphenol; coating adhesion remained constant.

TABLE 3

| PROPERTIES OF CURED CASTINGS | | | | | |
|---|---|---|---|---|---|
| Formulation | A[2] | B | C | D | E |
| Shore D hardness, 0–10 sec | | 77–75 | 76–74 | 76–75 | 71–67 |
| Elongation, % | | 1.8 | 2.1 | 2.5 | 17.1 |
| Heat deflection temperature, °C., 264 psi load/ 66 psi load | | 47.5/48 | 46/47 | 45.5/46 | 37/37.5 |
| Izod impact, ft-lb/in | | 0.14 | 0.11 | 0.19 | 0.16 |
| Tensile strength, psi | | 8,300 | 9,500 | 9,500 | 5,800 |
| Tensile modulus, psi | | 547,000 | 551,000 | 479,000 | 330,000 |
| Flexural strength, psi | | 12,000 | 13,100 | 14,400 | 10,000 |
| Flexural modulus, psi | | 520,000 | 489,000 | 465,000 | 297,000 |
| Compressive strength[3] | | | | | |
| at yield, psi | 13,300 | 13,500 | 14,400 | 14,400 | 9,000 |
| at failure, psi | 19,700 | 22,400 | 20,900 | 29,700 | 29,700 |

[1]Cured 7 days ~25° C.
[2]Formulation A was too brittle to unmold - no properties are available.
[3]One-inch cylinders, ½-inch diameter, cured 7 days ~25° C. Tested at 25° C. (77° F.).

Conclusions
Up to a certain nonylphenol level, strength properties increased and modulus values decreased, indicating stronger, more flexible systems. However, above that level, both strength and modulus values decreased sharply. Also, the heat deflection temperature decreased with very high nonylphenol levels. Impact and compressive strength values were largely unchanged. Elongation increased in Formulation E because of increased flexibility.

TABLE OF TEST METHODS

Gel Time (minutes) ASTM D-2471-71
Pencil hardness (cure) ASTM test D-3363-74
Gardner impact ASTM test D-2794-69
Gloss ASTM test D-523
Crosshatch adhesion (%) ASTM test D-3359-74
Shore D-Hardness 0–10 seconds ASTM test D-2240
Elongation (%) ASTM test D-638
Heat Deflection Temperature (°C., 264 psi/66 psi) ATSM D-648
Izod Impact Strength (ft lbs/in) ASTM test D-256
Tensile strength (psi) ASTM test D-638
Tensile Modulus (psi) ASTM test D-638
Flexural Strength (psi) ASTM test D-790
Flexural Modulus (psi) ASTM test D-790.

TABLE 4

| AGGREGATE PROPERTIES | | | | | |
|---|---|---|---|---|---|
| Formulation | A | B | C | D | E |
| Aggregate properties[1] | | | | | |
| Compressive strength, psi, | | | | | |
| @77° F. (25° C.) | 1,000 | 1,000 | 1,200 | 1,400 | 1,100 |
| @0° F. | 1,300 | 1,200 | 1,300 | 1,200 | 1,200 |
| @120° F. | 1,200 | 1,200 | 1,300 | 1,000 | 300 |
| after 20 freeze-thaw cycles[2] | 900 | 900 | 800 | 800 | 900 |

TABLE 4-continued
AGGREGATE PROPERTIES

| Formulation | A | B | C | D | E |
|---|---|---|---|---|---|
| Flexural strength, psi | 660 | 620 | 700 | 580 | 560 |

[1] 5.25 wt % binder mixed with rock, cured 7 days ~25° C.
[2] Samples dipped in water and chilled over dry ice for 5 hours. Blocks allowed to thaw overnight. Cycle repeated as specified.

Conclusions

Compressive strength values of aggregate blocks were nearly the same for all formulations when testing was performed at 77° F. (25° C.) or 0° F. Testing at 120° F. caused a large decrease in compressive strength for the system with the most nonylphenol.

TABLE 5
ACCELERATED WEATHERING DATA

| FORMULATION | A | B | C | D | E |
|---|---|---|---|---|---|
| Accelerated weathering data | | | | | |
| Appearance of aggregate blocks | | | | | |
| after Weatherometer exposure[1] | | | | | |
| 200 hours | 2 | 2 | 2 | 2 | 2 |
| 400 hours | 2 | 2 | 2 | 2 | 2 |
| 600 hours | 5 | 5 | 5 | 4 | 3 |
| 800 hours | 5,6 | 5,6 | 5 | 4 | 3 |
| 1,000 hours | 5,6 | 5,6 | 5 | 4 | 4 |

[1] Weatherometer exposure - continuous light from xenon lamp, 17 minutes water spray every 2 hours.
2 No change.
3 Slight loss of gloss.
4 Moderate loss of gloss.
5 Severe loss of gloss.
6 Some whitening.

Conclusions

All aggregate samples survived 400 hours Weatherometer exposure without change. By 600 hours, distinct differences were noted among the formulations. The three samples at the lower end of the nonylphenol range showed a severe loss of gloss while the other samples had not weathered nearly so badly. Although some loss of gloss was noted for all formulations, it is obvious that those systems containing high levels of nonylphenol were able to maintain higher gloss for longer periods of time.

The principle of the invention and the best mode contemplated for applying the principle have been described. It is to be understood that the foregoing is illustrative only and that other means and techniques can be employed without departing from the true scope of the invention defined in the following claims.

What is claimed is:

1. An epoxy resin composition comprising
(a) a vicinal polyepoxide having an average of at least 1.8 reactive 1,2-epoxy groups per molecule; and
(b) a stoichiometric amount of a curing agent comprising:
(i) 20 to 30 parts by weight of a first diamine of the general formula:

$$H_2NCH(CH_3)CH_2[OCH_2CH(CH_3)]_xNH_2$$

wherein x averages from 1 to 6;
(ii) 20 to 30 parts by weight of nonylphenol; and
(iii) 1 to 8 parts by weight of N-aminoethylpiperazine, and
(iv) 0.8 to 5 parts by weight of a substituted benzotriazole UV absorber of the formula:

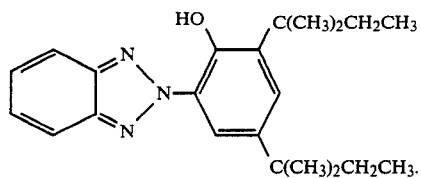

2. The composition of claim 1 wherein x averages from 2 to 3.
3. The composition of claim 1 wherein x averages from 2 to 3, the N-aminoethylpiperazine is in an amount of from 3 to 6 parts by weight and the substituted benzotriazole UV absorber is in an amount of 1 to 3 parts by weight.
4. The composition of claim 1 wherein x averages 2.6, the nonylphenol is in an amount approximately equal in parts by weight to the first diamine, the N-aminoethylpiperazine is in an amount of from 3 to 6 parts by weight.
5. The composition of claim 4 wherein the amount of substituted benzotriazole UV absorber is in an amount of about 1 to 3 parts by weight.
6. A decorative aggregate binder formulation comprising:
(1) aggregate;
(2) an epoxy resin composition in an amount to coat the aggregate, the epoxy resin composition comprising:
(a) a vicinal polyepoxide having an average of at least 1.8 reactive 1,2-epoxy groups per molecule, and
(b) a stoichiometric amount of a curing agent comprising:
(i) 20 to 30 parts by weight of a first diamine of the formula:

$$H_2NCH(CH_3)CH_2[OCH_2CH(CH_3)]_xNH_2$$

wherein x averages from 1 to 6;
(ii) 20 to 30 parts by weight of nonylphenol; and
(iii) 1 to 8 parts by weight of N-aminoethylpiperazine; and
(iv) 0.8 to 5 parts by weight of a substituted benzotriazole UV absorber of the formula:

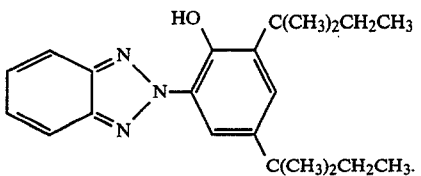

7. The formulation of claim 6 wherein x averages from 2 to 3.
8. The formulation of claim 6 wherein x averages from 2 to 3, the nonylphenol is in an amount of approximately equal in parts by weight to the first diamine and the N-aminoethylpiperazine is in an amount of from 3 to 6 parts by weight.
9. The formulation of claim 6 wherein x averages 2.6, the nonylphenol is in an amount approximately equal in parts by weight to the first diamine and the N-aminoethylpiperazine is in an amount of from 3 to 6 parts by weight.
10. The formulation of claim 9 wherein the amount of substituted benzotriazole UV absorber is in an amount of 1 to 3 /parts by weight.
11. The decorative aggregate formulation of claim 6 coated on a concrete surface.

* * * * *